United States Patent
Ho et al.

(10) Patent No.: US 9,904,381 B2
(45) Date of Patent: Feb. 27, 2018

(54) MULTI-FUNCTIONAL MOUSE DEVICE AND RELATED METHOD CAPABLE OF AUTOMATICALLY SWITCHING OPERATION MODES

(71) Applicant: BENQ CORPORATION, Taipei (TW)

(72) Inventors: Shuo-Yen Ho, Taipei (TW);
Ming-Sheng Tai, Taipei (TW)

(73) Assignee: BenQ Corporation, Taipei (TW)

( * ) Notice: Subject to any disclaimer, the term of this patent is extended or adjusted under 35 U.S.C. 154(b) by 98 days.

(21) Appl. No.: 14/972,045

(22) Filed: Dec. 16, 2015

(65) Prior Publication Data

US 2016/0179219 A1    Jun. 23, 2016

(30) Foreign Application Priority Data

Dec. 18, 2014  (TW) .............................. 103144369 A (51) Int. Cl.

| G06F 3/033 | (2013.01) |
|---|---|
| G06F 3/038 | (2013.01) |
| G06F 3/0354 | (2013.01) |
| H04N 21/00 | (2011.01) |

(52) U.S. Cl.
CPC ........ G06F 3/0383 (2013.01); G06F 3/03543 (2013.01); H04N 21/00 (2013.01)

(58) Field of Classification Search
CPC . G06F 3/033; G06F 3/00; G06F 3/041; G06F 3/045; G09G 5/08; G01R 27/26; G02F 1/1343; H01L 27/32

See application file for complete search history.

(56) References Cited

U.S. PATENT DOCUMENTS

| 9,223,422 B2 * | 12/2015 | Choi ..................... G06F 3/0383 |
| 2002/0190953 A1 * | 12/2002 | Gordon ................. G06F 3/0317 345/166 |
| 2003/0016417 A1 * | 1/2003 | Lee ........................ G08C 23/04 398/106 |
| 2003/0028688 A1 * | 2/2003 | Tiphane ................ G02B 27/20 710/1 |
| 2005/0078087 A1 * | 4/2005 | Gates .................. G06F 3/03543 345/163 |

(Continued)

FOREIGN PATENT DOCUMENTS

| TW | 200849064 | 12/2008 |
| TW | 200951775 | 12/2009 |
| TW | 201101099 | 1/2011 |

*Primary Examiner* — Pegeman Karimi (57) ABSTRACT

A method capable of automatically switching operation modes is applied to a multi-functional mouse device which has a first operation mode and a second operation mode. The multi-functional mouse device can move over a plane formed by a first axis and a second axis perpendicular to each other, and includes a coordinate positioning unit suitable for the second operation mode. The method includes detecting whether the coordinate positioning unit generates a first axial signal, detecting whether the coordinate positioning unit generates a second axial signal within a first predetermined period, determining whether continued time of the first axial signal and the second axial signal exceed over a second predetermined period, and determining whether the multi-functional mouse device is switched from the first operation mode to the second operation mode according to a determination result.

21 Claims, 7 Drawing Sheets

(56) References Cited

U.S. PATENT DOCUMENTS

| | | | |
|---|---|---|---|
| 2008/0134784 A1* | 6/2008 | Jeng | G01P 15/18 |
| | | | 73/514.01 |
| 2013/0141334 A1 | 6/2013 | Wu | |
| 2013/0150164 A1* | 6/2013 | Grever | A63F 13/21 |
| | | | 463/37 |

* cited by examiner

MULTI-FUNCTIONAL MOUSE DEVICE AND RELATED METHOD CAPABLE OF AUTOMATICALLY SWITCHING OPERATION MODES

BACKGROUND OF THE INVENTION

1. Field of the Invention

The present invention relates to a multi-functional mouse device and a related operating method, and more particularly, to a multi-functional mouse device and a related method capable of automatically switching operation modes.

2. Description of the Prior Art

The conventional television remote controller utilizes infrared communication technology or radio frequency (RF) communication technology to control the television or TV box. The conventional wireless mouse utilizes the RF communication technology to remote control the computer apparatus with a graphic user interface (GUI) system. The TV remote controller and the wireless mouse are independent remote controlling devices, and the user alternates application of the TV remote controller and the wireless mouse to alternatively control the electronic devices accordingly. The conventional multi-functional remote controlling device has a mode switching button, and the user triggers the mode switching button to switch operation modes of the conventional multi-functional remote controlling device, so as to output operating signals respectively corresponding to the television or the computer apparatus. Therefore, the operation modes of the conventional multi-functional remote controlling device are switched by an additional button triggering motion, which results in inconvenience.

SUMMARY OF THE INVENTION

The present invention provides a multi-functional mouse device and a related method capable of automatically switching operation modes for controlling different electronic devices for solving above drawbacks.

According to the claimed invention, a multi-functional mouse device capable of automatically switching operation modes to alternatively control a first electronic device and a second electronic is disclosed. The multi-functional mouse device includes a body, a first button module, a second button module and an operating processor. The body is adapted to move upon a plane formed by a first axis and a second axis perpendicular to each other. The first button module is disposed on the body and suitable for a first operation mode. The second button module is disposed on the body and suitable for a second operation mode. The second button module includes a coordinate positioning unit adapted to detect coordinate variation of the body and to accordingly generate a first axial signal and/or a second axial signal. The operating processor is disposed inside the body and electrically connected to the first button module and the second button module. The operating processor is switched from the first operation mode to the second operation mode while the coordinate variation conforms to a triggering condition.

According to the claimed invention, a method capable of automatically switching operation modes and being applied to a multi-functional mouse device having a remote-controlling mode and a mouse mode is disclosed. The multi-functional mouse device is adapted to move upon a plane formed by a first axis and a second axis perpendicular to each other and has a coordinate positioning unit suitable for the mouse mode. The method includes detecting whether the coordinate positioning unit generates a position signal, determining whether a continued period of the position signal exceeds over a predetermined period, and switching the multi-functional mouse device from the remote-controlling mode to the mouse mode while the multi-functional mouse device is set on the remote-controlling mode and the continued period of the position signal exceeds over the predetermined period.

According to the claimed invention, the position signal includes a first axial signal and a second axial signal. A step of switching the multi-functional mouse device from the remote-controlling mode to the mouse mode while the multi-functional mouse device is set on the remote-controlling mode and the continued period of the position signal exceeds over the predetermined period includes switching the multi-functional mouse device from the remote-controlling mode to the mouse mode while the second axial signal is generated within a first predetermined period after generation of the first axial signal and the continued period of the second axial signal exceeds over a second predetermined period.

According to the claimed invention, the position signal includes a first axial signal and a second axial signal, the multi-functional mouse device is switched from the remote-controlling mode to the mouse mode while the second axial signal is generated within another predetermined period after generation of the first axial signal.

According to the claimed invention, the position signal includes a first axial signal and a second axial signal, the multi-functional mouse device is switched from the remote-controlling mode to the mouse mode while the continued period of the first axial signal and/or the second axial signal exceeds over the predetermined period.

The multi-functional mouse device of the present invention can remote control the television and/or TV box by the remote-controlling mode, or control the computer apparatus with the graphic user interface (GUI) system by the mouse mode. The user may press the mode switching button or any button of the first button module to switch the multi-functional mouse device from the mouse mode (the second operation mode) to the remote-controlling mode (the first operation mode); the user may press the mode switching button or any button of the second button module, or move the multi-functional mouse device upon the plane to generate the first axial signal and the second axial signal by the coordinate positioning unit and to determine whether the axial signals are false or conforms to the triggering condition, so as to automatically switch the multi-functional mouse device from the remote-controlling mode (the first operation mode) to the mouse mode (the second operation mode).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
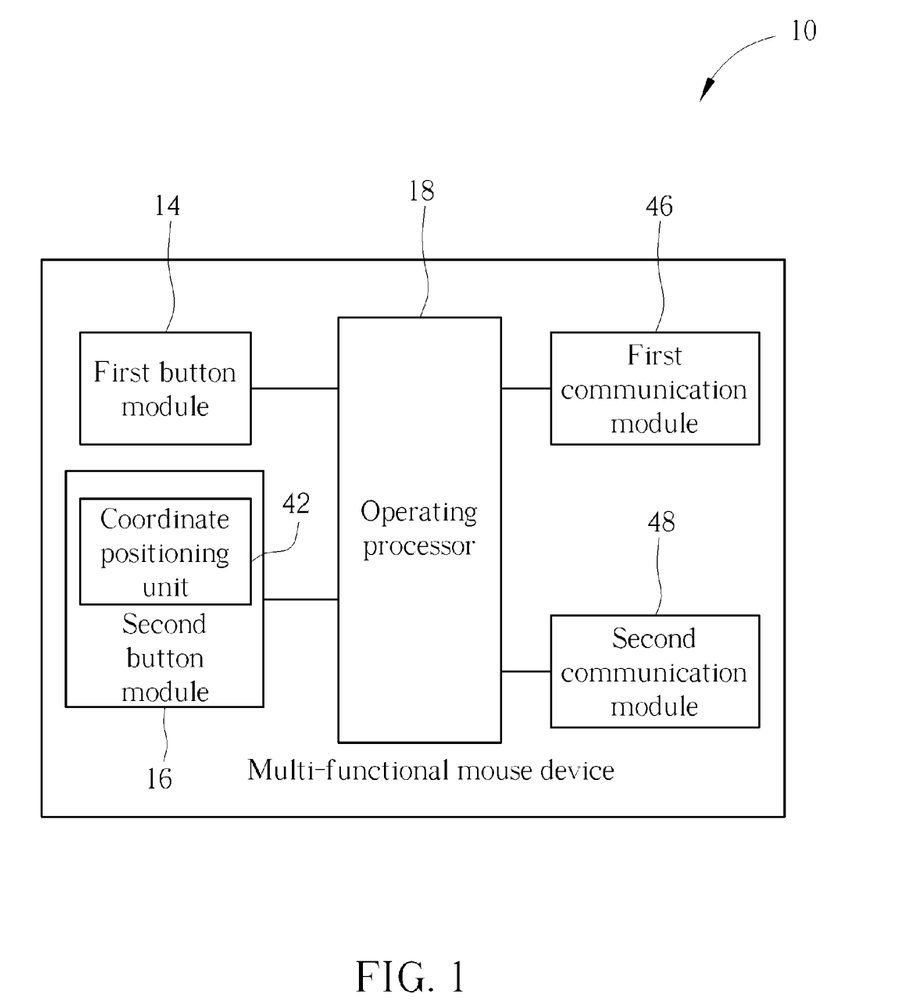
FIG. 1 is a functional block diagram of a multi-functional mouse device according to an embodiment of the present invention.
Figure 2:
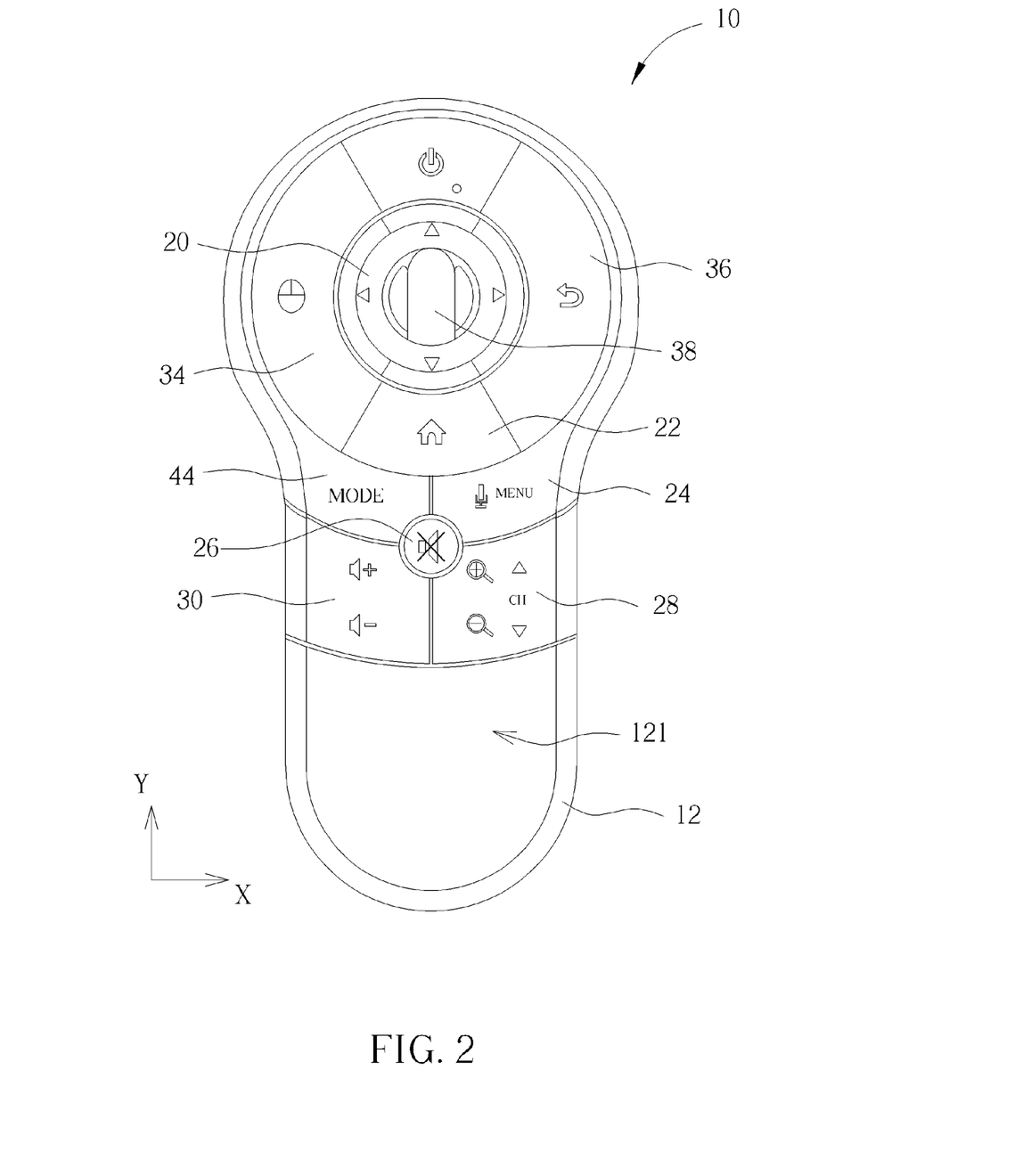
FIG. 2 is a diagram of the multi-functional mouse device according to the embodiment of the present invention.
Figure 7:
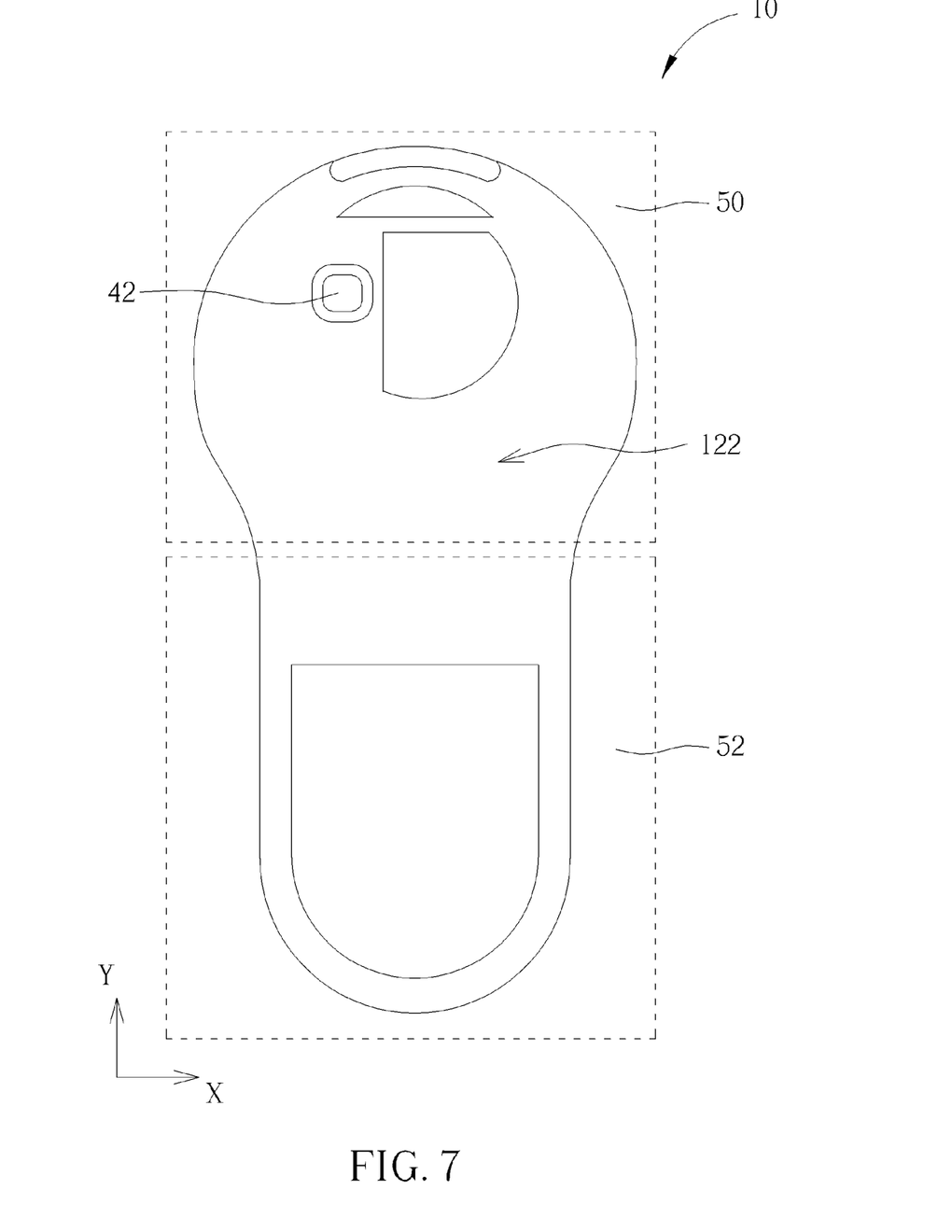
FIG. 7 is another view of the multi-functional mouse device shown in FIG. 2.

Please refer to FIG. 1, FIG. 2 and FIG. 7. FIG. 1 is a functional block diagram of a multi-functional mouse device 10 according to an embodiment of the present invention. FIG. 2 is a diagram of the multi-functional mouse device 10 according to the embodiment of the present invention. FIG. 7 is another view of the multi-functional mouse device 10 shown in FIG. 2. The multi-functional mouse device 10 includes a body 12, a first button module 14, a second button module 16 and an operating processor 18. The body 12 is a housing of the multi-functional mouse device 10. The body 12 can be moved upon a plane formed by a first axis and a second axis perpendicular to each other, such as the X-Y plane shown in FIG. 2. The first button module 14 is disposed on the body 12 and includes an arrow button 20, a homepage button 22, a menu button 24, a mute button 26, a channel adjusting button 28 and a volume adjusting button 30. While the multi-functional mouse device 10 is switched to a first operation mode (which represents a handheld mode or a remote-controlling mode), the first button module 14 can be utilized to control a first electronic device 32, such as the television or the TV box. The second button module 16 is disposed on the body 12 and includes a mouse left button 34, a mouse right button 36 and a roller unit 38. While the multi-functional mouse device 10 is switched to a second operation mode (which represents the mouse mode), the second button module 16 can be utilized to control a second electronic device 40 with a graphic user interface (GUI) system. Generally, the second electronic device 40 may be an apparatus with Android or Windows system.

The body 12 includes a first surface 121 and a second surface 122 opposite to each other. The first surface 121 can move upon the plane formed by the first axis and the second axis perpendicular to each other (which represents the X-Y plane as mentioned above), and the first button module 14 and the second button module 16 are disposed on the second surface 122. The body 12 is mainly divided into a first area 50 and a second area 52 adjacent by each other, for example, the first area 50 is located on an upper zone of the multi-functional mouse device 10 and the second area 52 is located on a lower zone of the multi-functional mouse device 10, and the first area 50 does not overlap the second area 52 preferably. The coordinate positioning unit 42 is disposed inside the first area 50, the second area 52 is a handle held by the user, and coordinate variation detected by the coordinate positioning unit 42 is stably accurate because it is unlikely to touch or interfere with the coordinate positioning unit 42 by user's fingers.

The second button module 16 further includes the coordinate positioning unit 42 which can detect the coordinate variation of the body 12 by optical detection or roller detection, and generate a first axial signal and/or a second axial signal accordingly. The multi-functional mouse device 10 further includes a mode switching button 44 disposed on the body 12. The mode switching button 44 is manually triggered to alternatively switch the first operation mode and the second operation mode. The operating processor 18 is disposed inside the body 12 and electrically connected to the first button module 14, the second button module 16 and the mode switching button 44. The operating processor 18 can switch the operation modes of the multi-functional mouse device 10 by manual switch of the mode switching button 44, or switch the operation modes of the multi-functional mouse device 10 by determining whether the coordinate variation of the multi-functional mouse device 10 conforms to a triggering condition. Besides, operating processor 18 can switch the multi-functional mouse device 10 to the first operation mode while any button of the first button module 14 is triggered, or switch the multi-functional mouse device 10 to the second operation mode while any button of the second button module 16 is triggered.

The multi-functional mouse device 10 further includes a first communication module 46 and a second communication module 48 electrically connected to the operating processor 18. The first button module 14 outputs an operating signal by the first communication module 46 to control channel switch and volume switch of the first electronic device 32 while the multi-functional mouse device 10 is set in the first operation mode, and the second button module 16 outputs the operating signal by the second communication module 48 to move a mouse cursor, to click the mouse left button or the mouse left button, and to drive the mouse roller while the multi-functional mouse device 10 is set in the second operation mode. Thus, the multi-functional mouse device 10 can automatically switch the remote-controlling mode (the first operation mode) and the mouse mode (the second operation mode) according to operating situation without additional manual behavior. The first communication module 46 can be an infrared communication module or a radio frequency (RF) communication module optionally, and the second communication module 48 can be the RF communication module.

Figure 3:
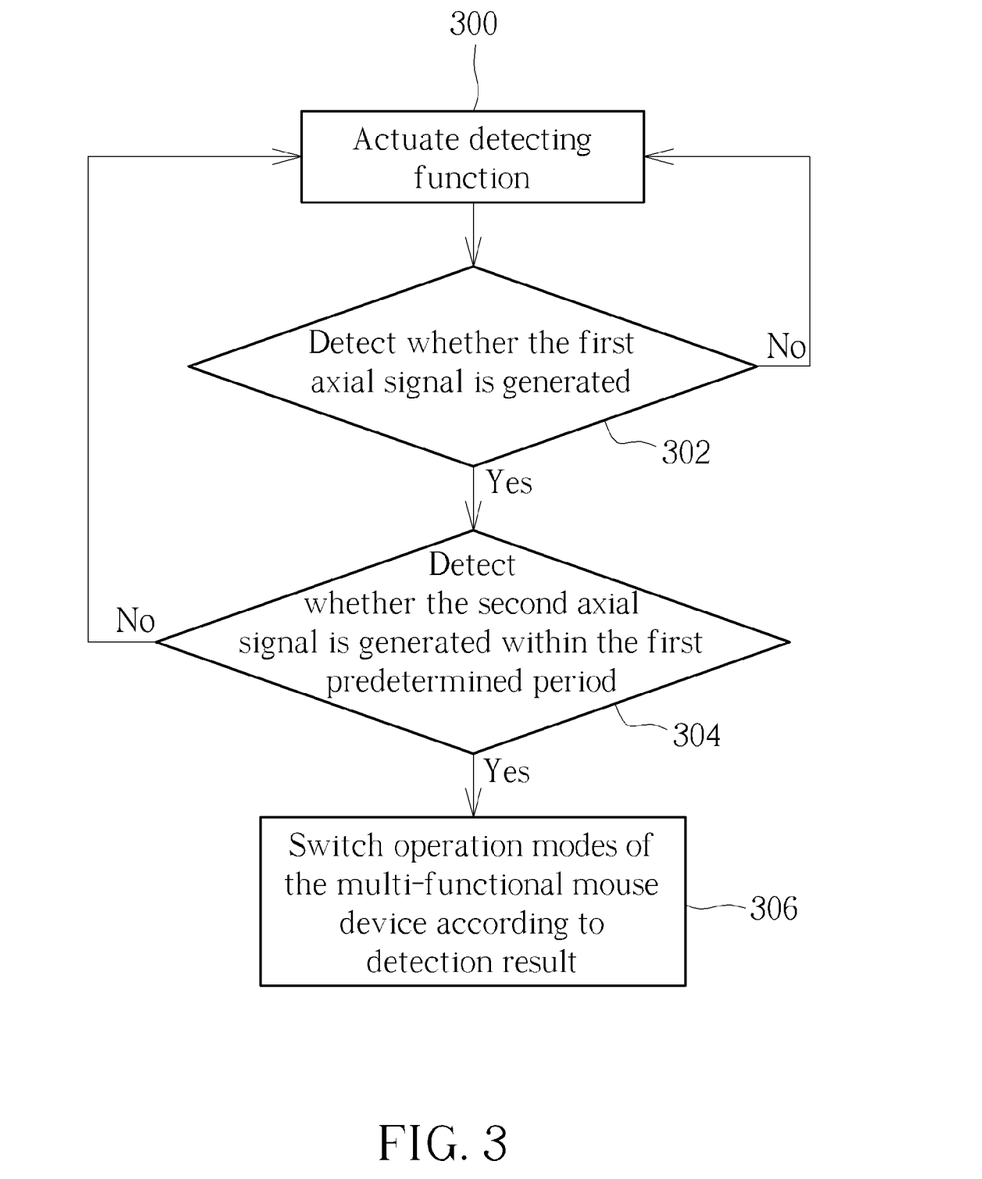
FIG. 3 is a flowchart of automatically switching the operation modes of the multi-functional mouse device according to a first embodiment of the present invention.

Please refer to FIG. 3. FIG. 3 is a flowchart of automatically switching the operation modes of the multi-functional mouse device 10 according to a first embodiment of the present invention. First, step 300 is executed to actuate a detecting function, and step 302 is executed that the operating processor 18 detects whether the coordinate positioning unit 42 generates the first axial signal. Step 300 is re-executed as the coordinate positioning unit 42 does not generate the first axial signal, and step 304 is executed that the operating processor 46 detects whether the coordinate positioning unit 42 generates the second axial signal within a first predetermined period. The first axial signal and the second axial signal can be represented as position signals. A range of the first predetermined period may preferably equal, but not limited to, 12 milliseconds. The multi-functional mouse device 10 can be held by the user to easily press the first button module 14 while in the remote-controlling mode (the first operation mode), and the coordinate positioning unit 42 does not detect the coordinate variation of the body 12. As the coordinate positioning unit 42 generates the first axial signal and the second axial signal within the first predetermined period simultaneously, the operating processor 18 determines that the multi-functional mouse device 10 is applied in the mouse mode (the second operation mode).

Step 300 is re-executed since the first axial signal and the second axial signal are not generated within the first predetermined period, and step 306 is executed while the first axial signal and the second axial signal are generated within the first predetermined period and the operating processor 18 switches the operation modes of the multi-functional mouse device 10 according to a detection result. That is to say, the multi-functional mouse device 10 keeps in the first operation mode (which means the multi-functional mouse device 10 is already set in the first operation mode) while the coordinate positioning unit 42 does not generate the first axial signal and the second axial signal within the first predetermined period; the multi-functional mouse device 10 is automatically switched to the second operation mode when the coordinate positioning unit 42 generates the first axial signal and the second axial signal within the first predetermined period, and an additional switch behavior is dispensable. The mode switching button 44 can be triggered or any button of the first button module 14 is pressed for switching the multi-functional mouse device 10 back to the first operation mode.

Figure 4:
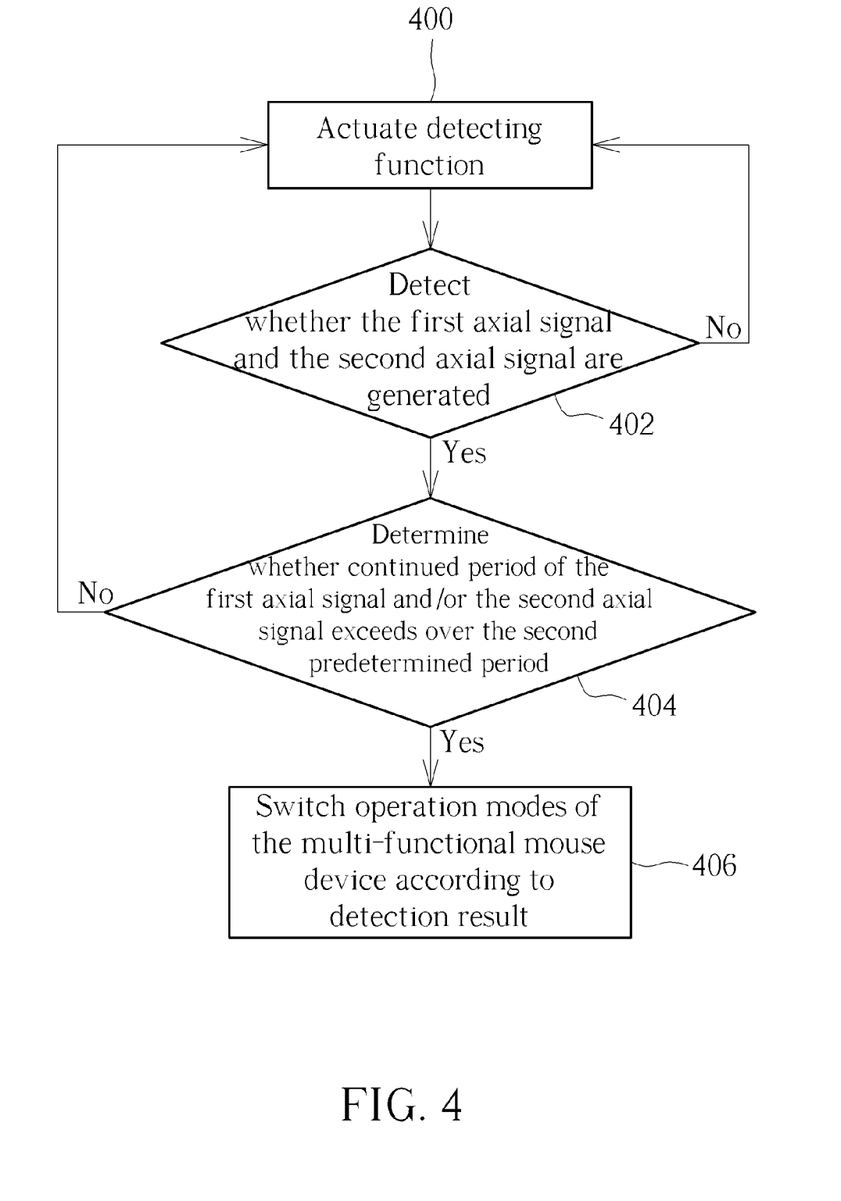
FIG. 4 is a flowchart of automatically switching the operation modes of the multi-functional mouse device according to a second embodiment of the present invention.

Please refer to FIG. 4. FIG. 4 is a flowchart of automatically switching the operation modes of the multi-functional mouse device 10 according to a second embodiment of the present invention. Step 400 is executed to actuate the detecting function, and step 402 is executed to detect whether the coordinate positioning unit 42 generates the first axial signal and the second axial signal by the operating processor 18. Step 400 is re-executed as the coordinate positioning unit 42 does not generate the first axial signal and the second axial signal; step 404 is executed as the coordinate positioning unit 42 generates the first axial signal and the second axial signal, and the operating processor 18 determines whether a continued period of the first axial signal and/or the second axial signal exceeds over a second predetermined period. A range of the second predetermined period may preferably equal, but not limited to, 500 milliseconds. The user actually implements the multi-functional mouse device 10 in the mouse mode results in the continued period of the first axial signal and/or the second axial signal exceeding over the second predetermined period, and false action of the multi-functional mouse device 10 results in the continued period lower than the second predetermined period. Thus, step 400 is re-executed while the continued period does not exceed the second predetermined period due to the false action; step 406 is executed while the continued period exceeds over the second predetermined period, and the operating processor 18 switches the operation modes of the multi-functional mouse device 10 according to a determination result.

Figure 5:
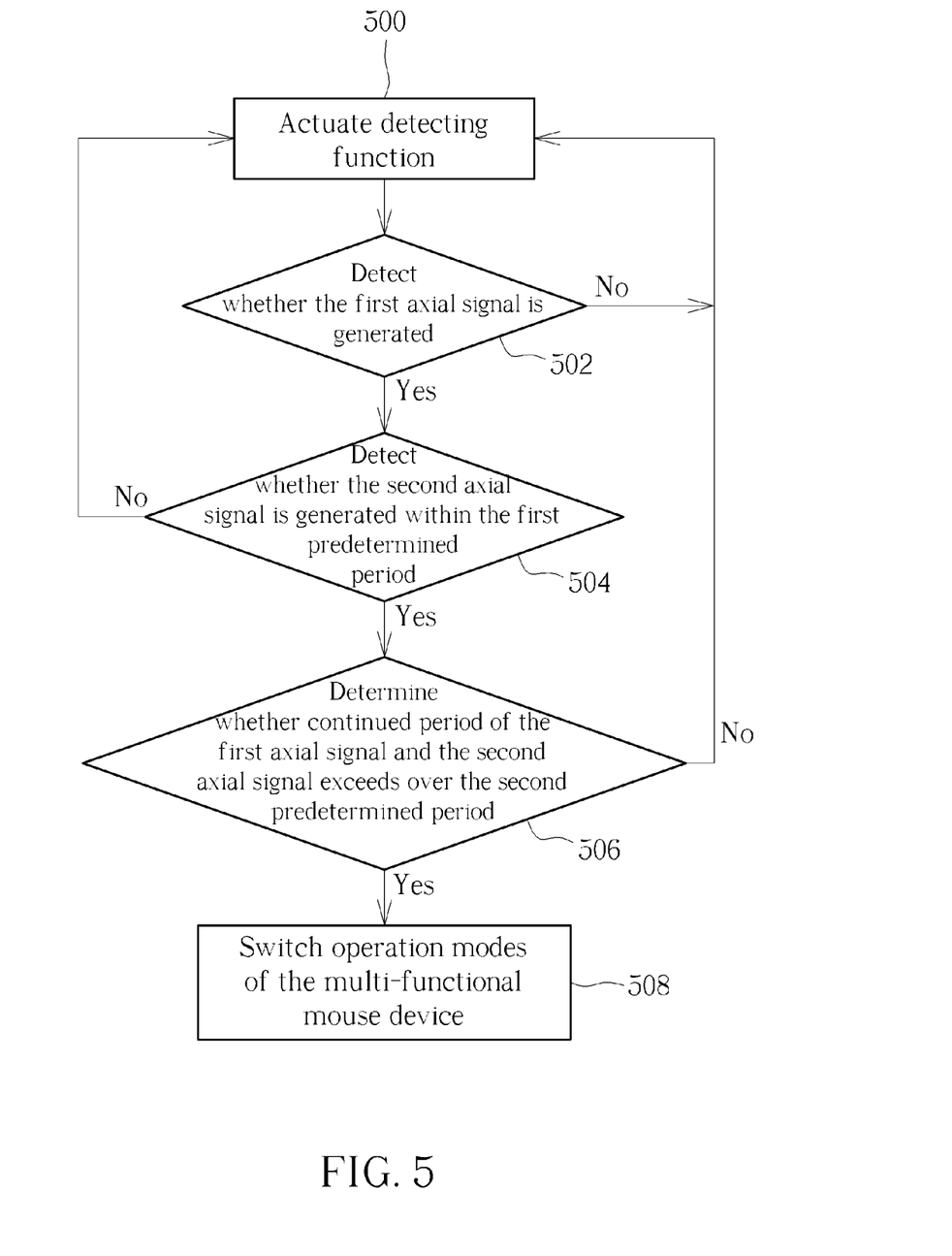
FIG. 5 is a flowchart of automatically switching the operation modes of the multi-functional mouse device according to a third embodiment of the present invention.

The first embodiment and the second embodiment as mentioned above respectively utilize time difference between the first axial signal and the second axial signal and the continued period of the first axial signal and/or the second axial signal to determine whether to automatically switch the operation modes of the multi-functional mouse device 10, and the foresaid parameters may be combined for increasing determination accuracy. Please refer to FIG. 5. FIG. 5 is a flow chart of automatically switching the operation modes of the multi-functional mouse device 10 according to a third embodiment of the present invention. Step 500 is executed to actuate the detecting function. Steps 502 and 504 are executed that the operating processor 18 detects whether the coordinate positioning unit 42 generates the first axial signal and then detects whether the second axial signal is generated within the first predetermined period. Generating sequence of the first axial signal and the second axial signal is not limited to the above-mentioned embodiment, which depends on design demand. Step 500 is re-executed as the first axial signal is not generated, or the second axial signal is not generated within the first predetermined period. Step 506 is executed while the first axial signal and the second axial signal are generated within the first predetermined period, and the operating processor 18 determines whether the continued period of the first axial signal and the second axial signal exceeds over the second predetermined period. In the third embodiment, ranges of the first predetermined period and the second predetermined period may preferably equal, but not limited to, 12 milliseconds and 500 milliseconds.

The false action is presumed while the continued period of the first axial signal and the second axial signal is lower than the second predetermined period, the multi-functional mouse device 10 keeps in the current operation mode and step 500 is re-executed. While the first axial signal and the second axial signal are generated within the first predetermined period and the continued period exceeds over the second predetermined period, the multi-functional mouse device 10 is presumed to move upon the plane, behavior of moving the multi-functional mouse device 10 is determined as using the multi-functional mouse device 10 by the mouse mode, and step 508 is executed to switch the multi-functional mouse device 10 from the first operation mode to the second operation mode by the operating processor 18. The mode switching button 44 can be triggered or any button of the first button module 14 can be pressed to switch the multi-functional mouse device 10 back to the first operation mode.

In conclusion, the multi-functional mouse device 10 can automatically switch the operation modes according to usage situation. For example, the user may use the multi-functional mouse device 10 to control the television, the arrow button 20, the menu button 24, the channel adjusting button 28 and the volume adjusting button 30 are mainly applied to input remote control commands; the user can switch the multi-functional mouse device 10 from the first operation mode (the remote-controlling mode) to the second operation mode (the mouse mode) by automatic switch of the multi-functional mouse device 10 moving upon the plane for mouse application (which generates the above-mentioned axial signals), or by manual switch of triggering the button such as clicking the mouse left button 34. The user may use the multi-functional mouse device 10 to control the computer, such as operating webpage browser and defining a control command by coordinates of the coordinate positioning unit 42; the multi-functional mouse device 10 is automatically switched from the second operation mode (the mouse mode) to the first operation mode (the remote-controlling mode) when the multi-functional mouse device 10 is inactive for a while and the coordinate positioning unit 42 does not generate the axial signals, and operations modes of the multi-functional mouse device 10 further can be manually switched by clicking the button applied to the first operation mode, such as pressing the arrow button 20.

Figure 6:
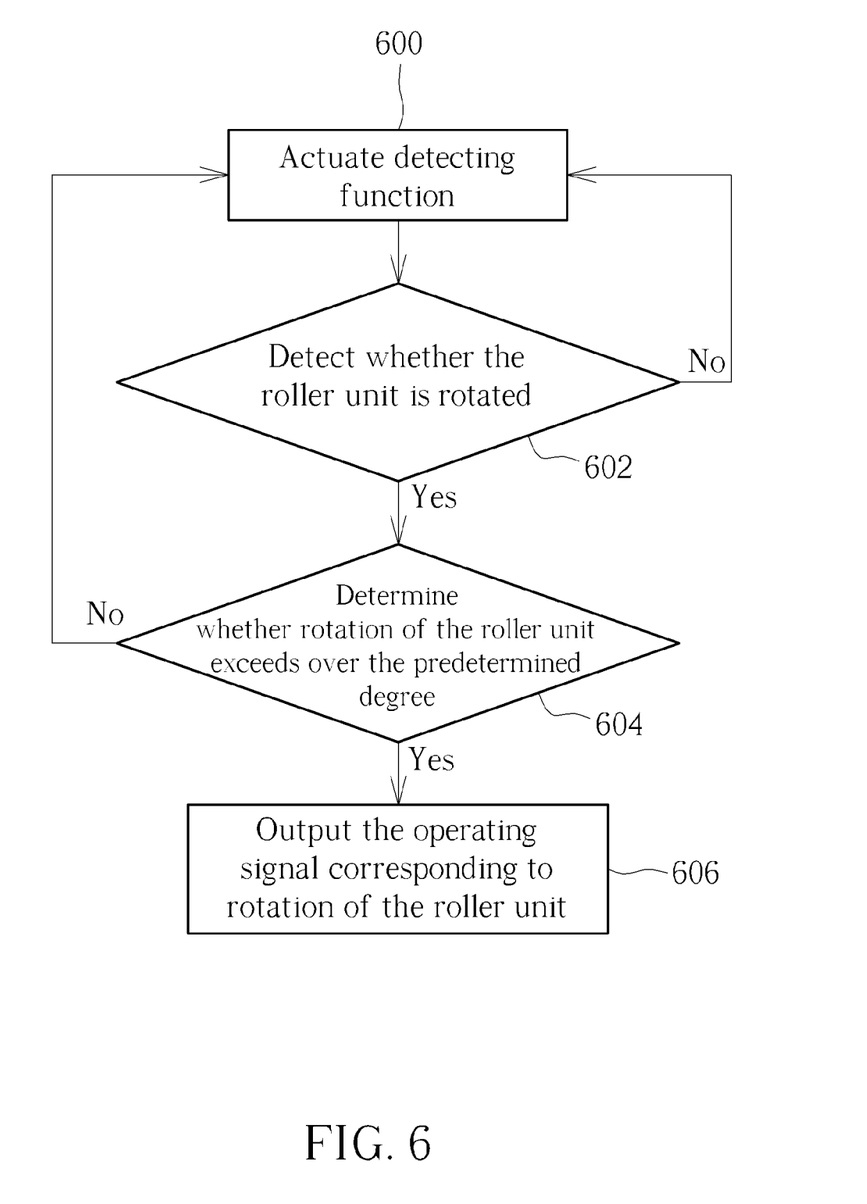
FIG. 6 is a flow chart of preventing the roller unit from being activated by false action according to the embodiment of the present invention.

The roller unit 38 can be rotated to move the mouse cursor and be clicked to confirm commands selected by the mouse cursor; however, accidental rotation of the roller unit 38 may easily result from click of the roller unit 38. For preventing erroneous judgment of the roller unit 38, the multi-functional mouse device 10 provides a false-proofing function to determine whether the user rotates or clicks the roller unit 38 by degree delay of the roller unit 38. Please refer to FIG. 6. FIG. 6 is a flow chart of preventing the roller unit from being activated by false action according to the embodiment of the present invention. Steps 600 and 602 are executed to actuate detection of the operating processor 18 for detecting rotation of the roller unit 38. Step 600 is re-executed while the roller unit 38 does not rotate, and the operating processor 18 does not output the operating signal of the roller unit 38. The roller unit 38 rotates step by step instead of continued rotation. Step 604 is executed while the roller unit 38 rotates, and the operating processor 18 determines whether rotation of the roller unit 38 exceeds over a predetermined degree, such as determining whether the rotation of the roller unit 38 exceeds over three degrees. Since the rotation of the roller unit 38 does not exceed over the predetermined degree, the false action is presumed or the roller unit 38 is just pressed, step 600 is re-executed and/or the roller pressing signal is output accordingly; since the foresaid rotation equals or exceeds over the predetermined degree, step 606 is executed and the operating processor 18 outputs the operating signal corresponding to rotary degrees of the roller unit 38.

The multi-functional mouse device of the present invention can remote control the television and/or TV box by the remote-controlling mode, or control the computer apparatus with the graphic user interface (GUI) system by the mouse mode. The user may press the mode switching button or any button of the first button module to switch the multi-functional mouse device from the mouse mode (the second operation mode) to the remote-controlling mode (the first operation mode); the user may press the mode switching button or any button of the second button module, or move the multi-functional mouse device upon the plane to generate the first axial signal and the second axial signal by the coordinate positioning unit and to determine whether the axial signals are false or conforms to the triggering condition, so as to automatically switch the multi-functional mouse device from the remote-controlling mode (the first operation mode) to the mouse mode (the second operation mode).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-functional mouse device capable of automatically switching operation modes, comprising:
   a body adapted to move upon a plane formed by a first axis and a second axis perpendicular to each other;
   a first button module disposed on the body and suitable for a first operation mode;
   a second button module disposed on the body and suitable for a second operation mode, the second button module comprising:
      a coordinate positioner adapted to detect coordinate variation of the body and to accordingly generate a first axial signal and/or a second axial signal; and
   an operating processor disposed inside the body and electrically connected to the first button module and the second button module, the operating processor being switched from the first operation mode to the second operation mode while the coordinate variation conforms to a triggering condition, wherein the coordinate positioner simultaneously generates the first axial signal and the second axial signal within a predetermined period, and the operating processor determines whether the coordinate variation conforms to the triggering condition.

2. The multi-functional mouse device of claim 1, wherein the operating processor confirms that the coordinate variation conforms to the triggering condition while a continued period of the first axial signal and/or the second axial signal exceeds over a predetermined period.

3. The multi-functional mouse device of claim 1, further comprising:
   a mode switching button disposed on the body and electrically connected to the operating processor, the operating processor being adapted to alternatively switch the first operation mode and the second operation mode according to trigger of the mode switching button.

4. The multi-functional mouse device of claim 1, wherein the operating processor is switched from the second operation mode to the first operation mode while any button of the first button module is triggered, and the operating processor is switched from the first operation mode to the second operation mode while any button of the second button module is triggered.

5. The multi-functional mouse device of claim 1, wherein the second button module further comprises a roller unit, the operating processor outputs an operating signal corresponding to rotation of the roller unit while the foresaid rotation exceeds over a predetermined degree.

6. The multi-functional mouse device of claim 1, wherein the multi-functional mouse device further comprises a first communication module and a second communication module electrically connected to the operating processor, the first button module and the second button module respectively utilize the first communication module and the second communication module to output corresponding operating signals.

7. The multi-functional mouse device of claim 6, wherein the first operation mode is a remote-controlling mode, the second operation mode is a mouse mode, the first communication module is an infrared communication module, and the second communication module is a radio frequency communication module.

8. The multi-functional mouse device of claim 1, wherein the body comprises a first surface and a second surface opposite to each other, the first surface is moved upon the plane formed by the first axis and the second axis perpendicular to each other, the first button module and the second button module are disposed on the second surface.

9. The multi-functional mouse device of claim 1, wherein the body is divided into a first area and a second area adjacent by each other, a coordinate positioner is disposed on the first area, and the second area is a handle of the multi-functional mouse device.

10. The multi-functional mouse device of claim 1, wherein the multi-functional mouse device is utilized to alternatively control a first electronic device and a second electronic device, the operating processor is adapted to switch to the second operation mode to control the second electronic device according to an operating signal of the second button module.

11. A method capable of automatically switching operation modes and being applied to a multi-functional mouse device having a remote-controlling mode and a mouse mode, the multi-functional mouse device being adapted to move upon a plane formed by a first axis and a second axis perpendicular to each other and having a coordinate positioner suitable for the mouse mode, the method comprising:
   detecting whether the coordinate positioner generates a position signal, the position signal comprising a first axial signal and a second axial signal;
   determining whether a continued period of the position signal exceeds over a predetermined period; and switching the multi-functional mouse device from the remote-controlling mode to the mouse mode while the second axial signal is generated within a first predetermined period after generation of the first axial signal and the continued period of the second axial signal exceeds over a second predetermined period.

12. The method of claim 11, wherein the multi-functional mouse device is switched into the mouse mode while the first axial signal and the second axial signal are generated within the first predetermined period and the continued period exceeds over the second predetermined period.

13. The method of claim 11, wherein the multi-functional mouse device further comprises a mode switching button, the method further comprises:
   switching the remote-controlling mode and the mouse mode alternatively according to trigger of the mode switching button.

14. The method of claim 11, wherein the multi-functional mouse device further comprises at least two button modules respectively suitable for the remote-controlling mode and the mouse mode, the method further comprises:
   determining whether any button of one of the at least two button modules is triggered; and
   switching the multi-functional mouse device to the remote-controlling mode or the mouse mode according to a corresponding button module whereon the triggered button is disposed.

15. The method of claim 11, wherein the multi-functional mouse device further comprises a roller unit, the method further comprises:
   detecting rotation of the roller unit;
   determining whether the rotation of the roller unit exceeds over a predetermined degree; and
   determining whether to output an operating signal corresponding to the foresaid rotation according to a determination result.

16. The method of claim 11, wherein the position signal comprises a first axial signal and a second axial signal, the multi-functional mouse device is switched from the remote-controlling mode to the mouse mode while the second axial signal is generated within another predetermined period after generation of the first axial signal.

17. The method of claim 16, wherein the multi-functional mouse device is set on the remote-controlling mode while the first axial signal and the second axial signal are not generated within the another predetermined period, and the multi-functional mouse device is set on the mouse mode while the first axial signal and the second axial signal are generated within the another predetermined period.

18. A multi-functional mouse device capable of automatically switching operation modes, comprising:
   a body adapted to move upon a plane formed by a first axis and a second axis perpendicular to each other;
   a first button module disposed on the body and suitable for a first operation mode;
   a second button module disposed on the body and suitable for a second operation mode, the second button module comprising:
      a coordinate positioner adapted to detect coordinate variation of the body and to accordingly generate a first axial signal and/or a second axial signal; and
   an operating processor disposed inside the body and electrically connected to the first button module and the second button module, the operating processor being switched from the first operation mode to the second operation mode while the coordinate variation conforms to a triggering condition, wherein the operating processor confirms that the coordinate variation conforms to the triggering condition while the coordinate positioner simultaneously generates the first axial signal and the second axial signal within a first predetermined period, and a continued period of the first axial signal and/or the second axial signal exceeds over a second predetermined period.

19. A multi-functional mouse device capable of automatically switching operation modes, comprising:
   a body adapted to move upon a plane formed by a first axis and a second axis perpendicular to each other;
   a first button module disposed on the body and suitable for a first operation mode;
   a second button module disposed on the body and suitable for a second operation mode, the second button module comprising:
      a coordinate positioner adapted to detect coordinate variation of the body and to accordingly generate a first axial signal and/or a second axial signal; and
   an operating processor disposed inside the body and electrically connected to the first button module and the second button module, the operating processor being switched from the first operation mode to the second operation mode while the coordinate variation conforms to a triggering condition;
   wherein the operating processor is switched from the second operation mode to the first operation mode while any button of the first button module is triggered, and the operating processor is switched from the first operation mode to the second operation mode while any button of the second button module is triggered.

20. A method capable of automatically switching operation modes and being applied to a multi-functional mouse device having a remote-controlling mode and a mouse mode, the multi-functional mouse device being adapted to move upon a plane formed by a first axis and a second axis perpendicular to each other and having a coordinate positioner suitable for the mouse mode, the method comprising:
   detecting whether the coordinate positioner generates a position signal, the position signal comprising a first axial signal and a second axial signal;
   determining whether a continued period of the position signal exceeds over a predetermined period; and
   switching the multi-functional mouse device from the remote-controlling mode to the mouse mode while the continued period of at least one of the first axial signal and the second axial signal exceeds over the predetermined period.

21. The method of claim 20, wherein the multi-functional mouse device is set on the remote-controlling mode while the continued period does not exceed over the predetermined period, and the multi-functional mouse device is set on the mouse mode while the continued period exceeds over the predetermined period.

* * * * *